(12) United States Patent
Sato et al.

(10) Patent No.: US 8,071,929 B2
(45) Date of Patent: Dec. 6, 2011

(54) AUTOMATIC FOCUS CONTROL UNIT, ELECTRONIC DEVICE AND AUTOMATIC FOCUS CONTROL METHOD

(75) Inventors: Hideki Sato, Miyagi (JP); Mitsuo Hoshi, Miyagi (JP); Kiyoyuki Kikuchi, Miyagi (JP); Kohki Matsuki, Osaki (JP); Takuju Takeyama, Miyagi (JP)

(73) Assignee: Sony Corporation, Tokyo (JP)

( * ) Notice: Subject to any disclaimer, the term of this patent is extended or adjusted under 35 U.S.C. 154(b) by 457 days.

(21) Appl. No.: 12/406,462

(22) Filed: Mar. 18, 2009

(65) Prior Publication Data
US 2009/0256058 A1 Oct. 15, 2009

(30) Foreign Application Priority Data
Apr. 11, 2008 (JP) ................. 2008-103984

(51) Int. Cl.
G02B 7/04 (2006.01)
G06M 7/00 (2006.01)
(52) U.S. Cl. ..................... 250/201.3; 250/221

(58) Field of Classification Search .... 250/201.2–201.4, 250/201.6, 201.7, 201.8, 221; 359/368, 381, 359/383, 384; 348/345, 349–351, 353–357
See application file for complete search history.

(56) References Cited

U.S. PATENT DOCUMENTS

| | | | |
|---|---|---|---|
| 6,567,126 B1 * | 5/2003 | Slatter et al. | 348/345 |
| 7,301,133 B2 * | 11/2007 | Weiss | 250/201.3 |
| 7,345,814 B2 * | 3/2008 | Yoneyama et al. | 359/383 |
| 2006/0249651 A1 * | 11/2006 | Kurata et al. | 250/201.2 |
| 2008/0111911 A1 * | 5/2008 | Kawanabe | 348/345 |

FOREIGN PATENT DOCUMENTS

| | | |
|---|---|---|
| JP | 10-161195 | 6/1998 |
| JP | 11-249027 | 9/1999 |

* cited by examiner

*Primary Examiner* — Que T Le
*Assistant Examiner* — Pascal M Bui Pho
(74) *Attorney, Agent, or Firm* — SNR Denton US LLP

(57) ABSTRACT

Disclosed herein is an automatic focus control unit including: a first light-emitting element; a line sensor; a second light-emitting element; a slit member; a shifting mechanism; and a controller.

10 Claims, 10 Drawing Sheets

AUTOMATIC FOCUS CONTROL UNIT, ELECTRONIC DEVICE AND AUTOMATIC FOCUS CONTROL METHOD

BACKGROUND OF THE INVENTION

1. Field of the Invention

The present invention relates generally to automatic focus control units and methods for automatically controlling a focal point by positionally adjusting a testing sample and an object lens. In particular, the invention relates to an automatic focus control unit and method, and an electronic device capable of performing focusing depending on an object lens when a plurality of object lenses are switched for use.

2. Description of the Related Art

In the field of optical equipment such as optical microscopes, depth meters, etc., auto focus devices have been used as devices for automatically focusing on a testing sample to be checked.

Examples of the automatic focus devices include one in which a laser beam is directed to a testing sample, a laser beam reflected from the testing sample is detected as the reflected laser beam, the positional relationship with the testing sample is determined based on the reflected laser beam for automatic focusing. This automatic focus device is provided with an optical detector such as a photo diode, which detects the reflected laser beam.

If the automatic focus device as described above is used in an optical microscope, a laser beam is emitted from a light source and directed to a testing sample via an object lens. The laser beam directed via the object lens becomes the reflected laser beam on the testing sample, which is directed to a photo detector via the object lens again.

The reflected laser beam forms on the photo detector a spot corresponding to the distance between the testing sample and the object lens. In the optical microscope mounted with the automatic focus device thereon, the object lens is shifted so that the reflected laser beam may form the spot at a predetermined position on the photo detector. In this way, the optical microscope performs focusing.

Known examples of focal point detecting methods used for microscopes include a knife-edge method, a differential spot-size method, an astigmatism method, a lateral shift method, and a Foucault method. Among them, a technique using the knife-edge method is generally used in the art.

The knife-edge method is a focal point detecting technique which uses a knife-edge mirror and a dual partitioning light-receiving element to perform automatic focusing. For example, as shown in FIG. 12, a laser beam emitted from a semiconductor diode 102 is directed to a testing sample 103 via a collimator lens 106 and via an object lens 101 while the knife-edge mirror 105 shields about half of the optical flux. The laser beam reflected from the testing sample 103 is reflected by the mirror surface of the knife-edge mirror 105 toward the dual partitioning light-receiving element 104. The dual portioning light-receiving element 104 is previously positioned so that the same amount of the reflected laser beam may be directed to two light-receiving sections constituting the dual partitioning light-receiving element 104 while the object lens 101 is focused on the front surface of the testing sample 103.

If the testing sample 103 is out of focus, then the laser beam reflected from the testing sample 103 is offset from an incident position of the dual partitioning light-receiving element 104. This causes a difference between outputs from the two light-receiving elements constituting the dual partitioning light-receiving elements 104. Accordingly, the knife-edge method achieves focusing on the testing sample 103 by shifting the testing sample 103 or the object lens 101 in the optical-axial direction to a position where the outputs from the two light-receiving elements become equal to each other.

Incidentally, in recent years, LCD panels, electronic devices, etc. have been formed with minute circuit patterns and substrates have increasingly been large-sized. Its manufacturing step and checking step have increasingly desired to specify and focus on a test object area with speed and accuracy. To meet the necessity, a parts test under a microscope has been proposed as below. A plurality of object lenses are provided which are different in magnification from each other. A low-power object lens is used when an alignment mark for a large-sized testing sample is detected, whereas a high-power object lens is used when a desired area of the testing sample is checked. That is to say, the object lenses are switched for use depending on the positions or states of a check portion.

In a focal point detecting method using the knife-edge method, however, if the object lens 101 is switched to cause the misalignment of optical axis or color aberration, then the incident position of the dual partitioning light-receiving element 104 will deviate as shown in FIG. 13. This needs such a device as to add a corrective value to the output from the dual partitioning light-receiving element 104 for each of the object lenses 101.

A focal point control method is proposed as a technique for correcting color aberration. In the focal point control method, a focusing error can be corrected even when a color aberration correcting lens is shifted in the optical-axial direction and an object lens having a different color aberration characteristic is used for replacement. This method may need a device for shifting the color aberration correcting lens without the misalignment of optical axis, which may desire high-accurate assembly. In addition, the increased optical parts will enlarge the configuration thereof as well as increase the cost of focal point detecting equipment. Thus, it is difficult to mount the focal point detecting equipment on the traditional, standard microscope.

See Japanese Patent Laid-open Nos. Hei 10-161195 and Hei 11-249027.

SUMMARY OF THE INVENTION

It is desirable to provide an automatic focus control unit, an electronic device provided with the same, and an automatic focus control method capable of performing focusing with speed and accuracy by correcting a misalignment of optical axis and color aberration occurring due to the switching of an object lens.

According to an embodiment of the present invention, there is provided an automatic focus control unit including: a first light-emitting element adapted to emit a laser beam to a sample via a single object lens selected from a plurality of object lenses different in magnification from each other; a line sensor having a plurality of light-receiving elements arranged adjacently to each other, a portion of the plurality of light-receiving elements receiving light reflected from the sample; a second light-emitting element adapted to emit a laser beam to another portion of the plurality of light-receiving elements; a slit member adapted to cut across the line sensor so as to gradually increase an area of the line sensor irradiated with the laser beam emitted from the second light-emitting element; a shifting mechanism operative to relatively shift the line sensor in an arrangement direction of the plurality of light-receiving elements with respect to an optical axis of the reflected light; and a controller adapted to register the plurality of light-receiving elements irradiated with the laser beam emitted from the second light-emitting element and amounts of light received by the plurality of light-receiving elements in association with the selected object lens in a state where the selected object lens is focused on the sample, and control a position of the line sensor based on the registered values when the object lens is used again.

According to another embodiment of the present invention, there is provided an electronic device equipped with an automatic focus control device including: a first light-emitting element adapted to emit a laser beam to a sample via a single object lens selected from a plurality of object lenses different in magnification from each other; a line sensor having a plurality of light-receiving elements arranged adjacently to each other, a portion of the plurality of light-receiving elements receiving light reflected from the sample; a second light-emitting element adapted to emit a laser beam to another portion of the plurality of light-receiving elements; a slit member adapted to cut across the line sensor so as to gradually increase an area of the line sensor irradiated with the laser beam emitted from the second light-emitting element; a shifting mechanism operative to relatively shift the line sensor in an arrangement direction of the plurality of light-receiving elements with respect to an optical axis of the reflected light; and a controller adapted to register the plurality of light-receiving elements irradiated with the laser beam emitted from the second light-emitting element and amounts of light received by the plurality of light-receiving elements in association with the selected object lens in a state where the selected object lens is focused on the sample, and controlling a position of the line sensor based on the registered values when the object lens is used again.

According to another embodiment of the present invention, there is provided an automatic focus control method including the steps of: registering, for each of a plurality of object lenses provided in a selectable manner and having different magnifications, as reference elements a plurality of light-receiving elements located close to one end of a line sensor to be subjected to irradiation with light reflected from a sample and another plurality of light-receiving elements located close to the other end of the line sensor so as to have a gradually increased area that receives a laser beam emitted from a second light-emitting element via a slit member, at a reference position of the line sensor where a laser beam emitted from the a first light-emitting element is focused on the sample, and registering amounts of light received by the reference elements located close to the other end of the line sensor as reference signals; shifting the line sensor to the reference position based on the reference elements and on the reference signal in association with the selected object lens; and shifting the object lens or the sample in an optical-axial direction of the object lens so that reflected light resulting from the laser beam directed to the sample via the selected object lens may equally be directed to the reference elements located close to the one end of the line sensor shifted to the reference position.

According to the embodiments of the present invention, since the line sensor is previously shifted to the reference position associated with the selected object lens, quick focusing can be performed without large deviation of the focus of the object lens on the sample.

DETAILED DESCRIPTION OF THE PREFERRED EMBODIMENTS

A detailed description will hereinafter be given of a microscope 1 to which an automatic focus control unit, an electronic device and an automatic focus control method according to the embodiments of the present invention are applied with reference to the drawings.

Figure 1:
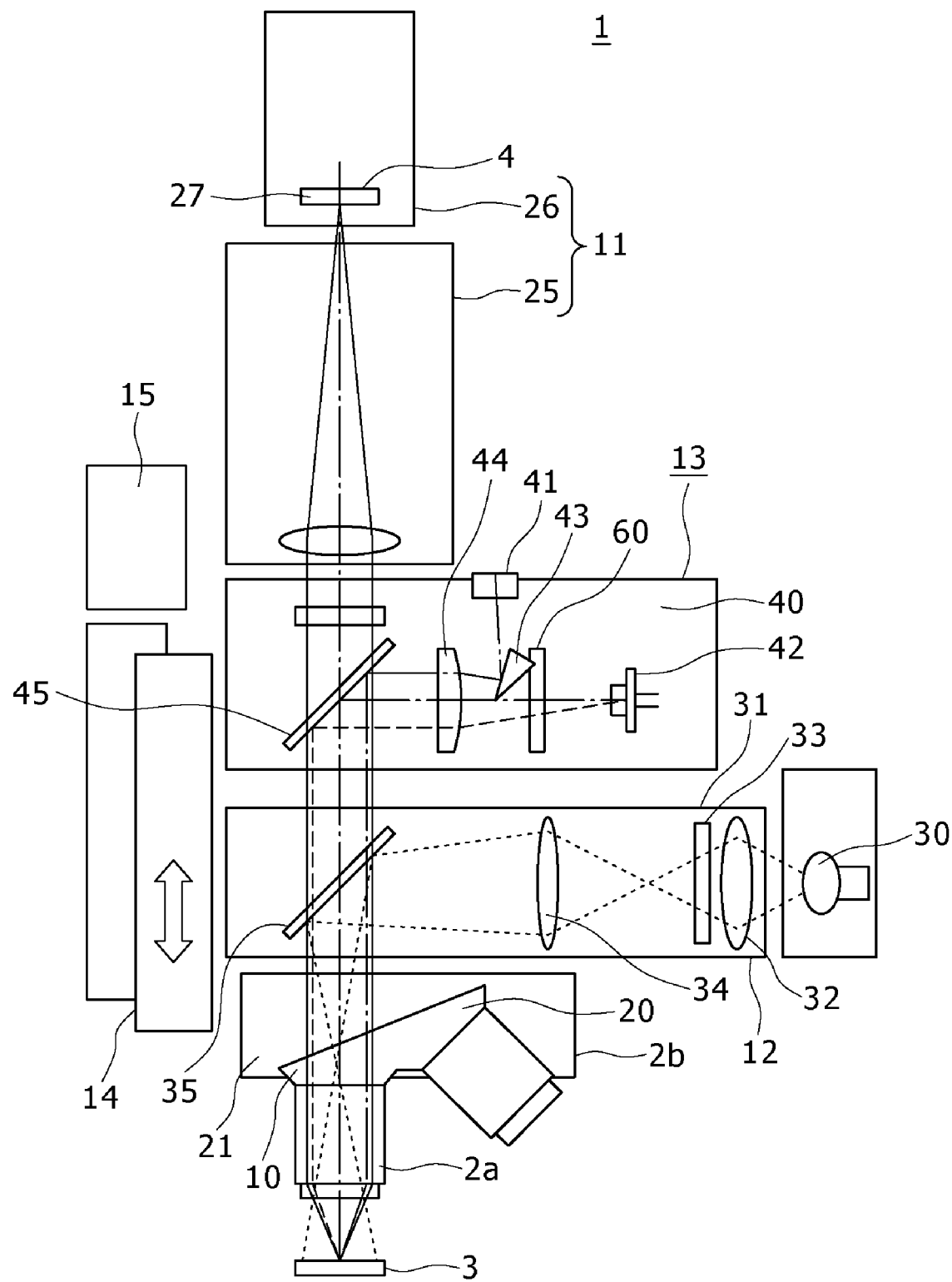
FIG. 1 is a schematic diagram illustrating a configuration of a microscope.

Referring to FIG. 1, the microscope 1 includes an object lens unit 10 provided with a plurality of object lenses 2 different in magnification from each other; an image pick-up unit 11 adapted to receive reflected light resulting from a laser beam directed to and reflected from a testing sample 3, and provided with an image pick-up element 4; and an illumination unit 12 for illuminating the objective lens 2 with illumination light through the objective lens 2. The object lens unit 10 further includes an automatic focus control unit 13 for detecting the focal point of the object lens 2 relative to the testing sample 3; a drive unit 14 for varying the distance between the object lens unit 10 and a stage on which the testing sample 3 is placed depending on the detection results; and a controller 15 for driving the drive unit 14 depending on the detection results of the automatic focus control unit 13.

Such a microscope 1 can switchably use the objective lenses 2 different in magnification from each other in association with the testing sample 3 or a check portion by turning the object lens unit 10. In addition, the microscope 1 can allow the automatic focus control unit 13 to execute focus detection depending on the objective lens 2 switched.

As shown in FIG. 1, the object lens unit 10 includes the plurality of object lenses 2a, 2b, etc.; a revolver 20 attached with the object lenses 2; a revolver support portion 21 for turnably supporting the revolver 20; and a detection section not illustrated for detecting which one of attachment holes formed in the revolver 20 receives the object lens 2 attached thereto. The revolver 20 is formed on an outer circumferential surface with a plurality of the attachment holes adapted to receive the object lenses 2 attached thereto. Specifically, the plurality of object lenses 2a, 2b, etc. different in magnification from each other are attached to the attachment holes. The revolver support portion 21 supports the revolver 20 so that the object lenses 2 may be moved on the optical path of the microscope 1. In addition, the revolver support portion 21 incorporates a rotary motor mechanism for turning the revolver 20. Further, the revolver support portion 21 is connected to the illumination unit 12 and attached with the drive unit 14.

Such an object lens unit 10 is supported in the state where the optical axis of a single object lens 2 is aligned with the optical path of the microscope 1 by automatically or manually turning the revolver 20. In this case, the object lens unit 10 is such that the object lens 2 selected is opposed to the stage so that the testing sample 3 placed on the stage can be checked at a desired magnification.

The image pick-up unit 11 is disposed opposite the object lens unit 10 and constitutes an observation optical system whose optical path diverges from the illumination unit 12 described below and the automatic focus control unit 13. In addition, the image pick-up unit 11 includes a lens barrel section 25 incorporating a collective lens group; and a camera section 26 incorporating an image pick-up element 27 such as a CCD or the like. The image pick-up unit 11 is such that the camera section 26 produces a video signal of the testing sample 3 and routes it to a monitor not illustrated.

The illumination unit 12 emits a desired quantity of light from an illumination light source 30 to the testing sample 3 for illumination so that the image pick-up unit 11 can check it. The illumination unit 12 includes a first lens 32, an aperture diaphragm 33, a second lens 34 and an illumination mirror 35 which are disposed on the same optical axis in the lens barrel 31.

In the illumination unit 12, the light emitted from the illumination light source 30 is collected by the first lens 32 and directed to the second lens 34 via the aperture diaphragm 33. The light directed to the second lens 34 is made to have a predetermined spot diameter, reflected by the illumination mirror 35 toward the object lens unit 10 and directed to the testing sample 3.

Figure 2:
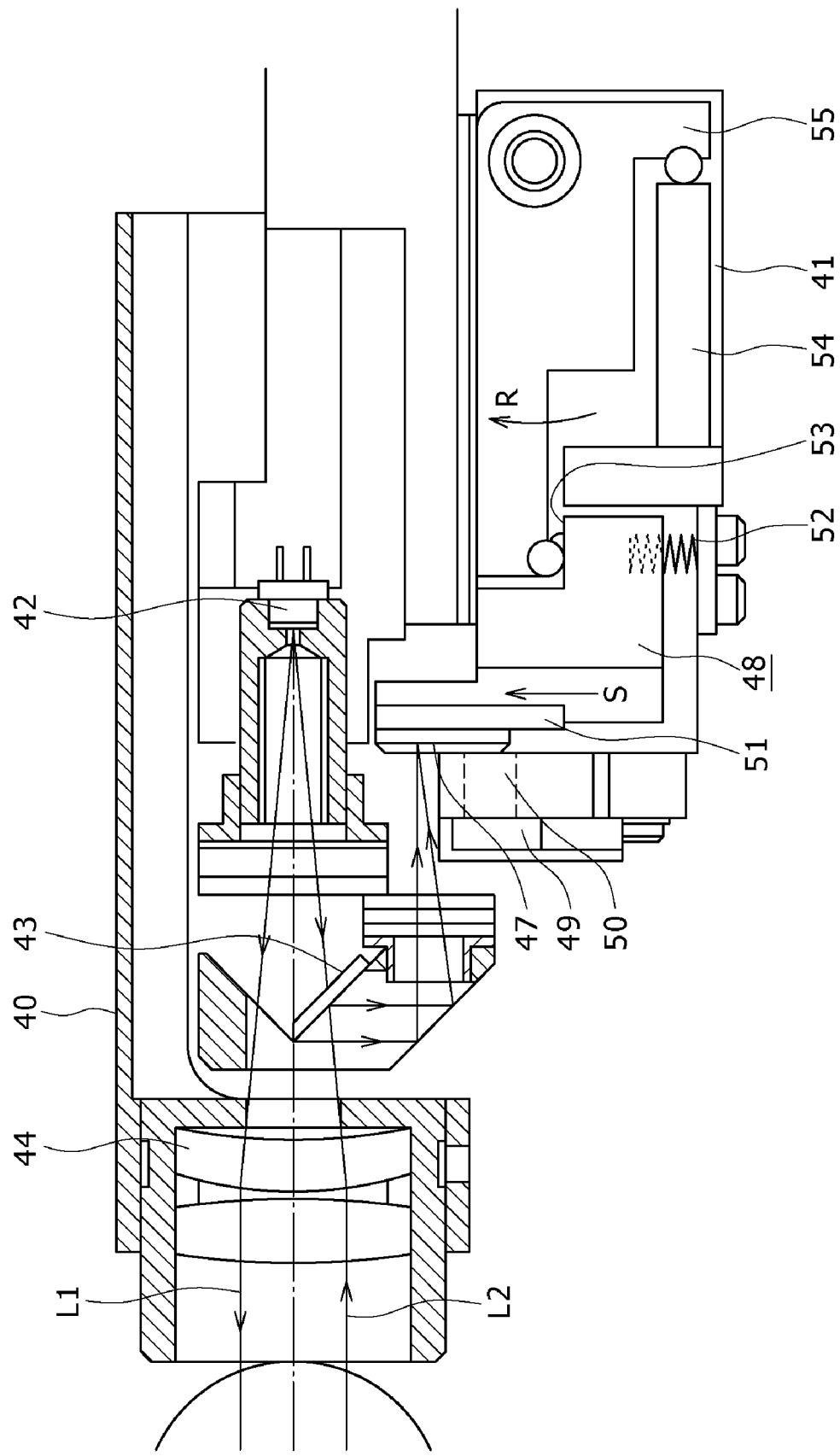
FIG. 2 is a cross-sectional view illustrating an embodiment of an automatic focus control unit.
Figure 3:
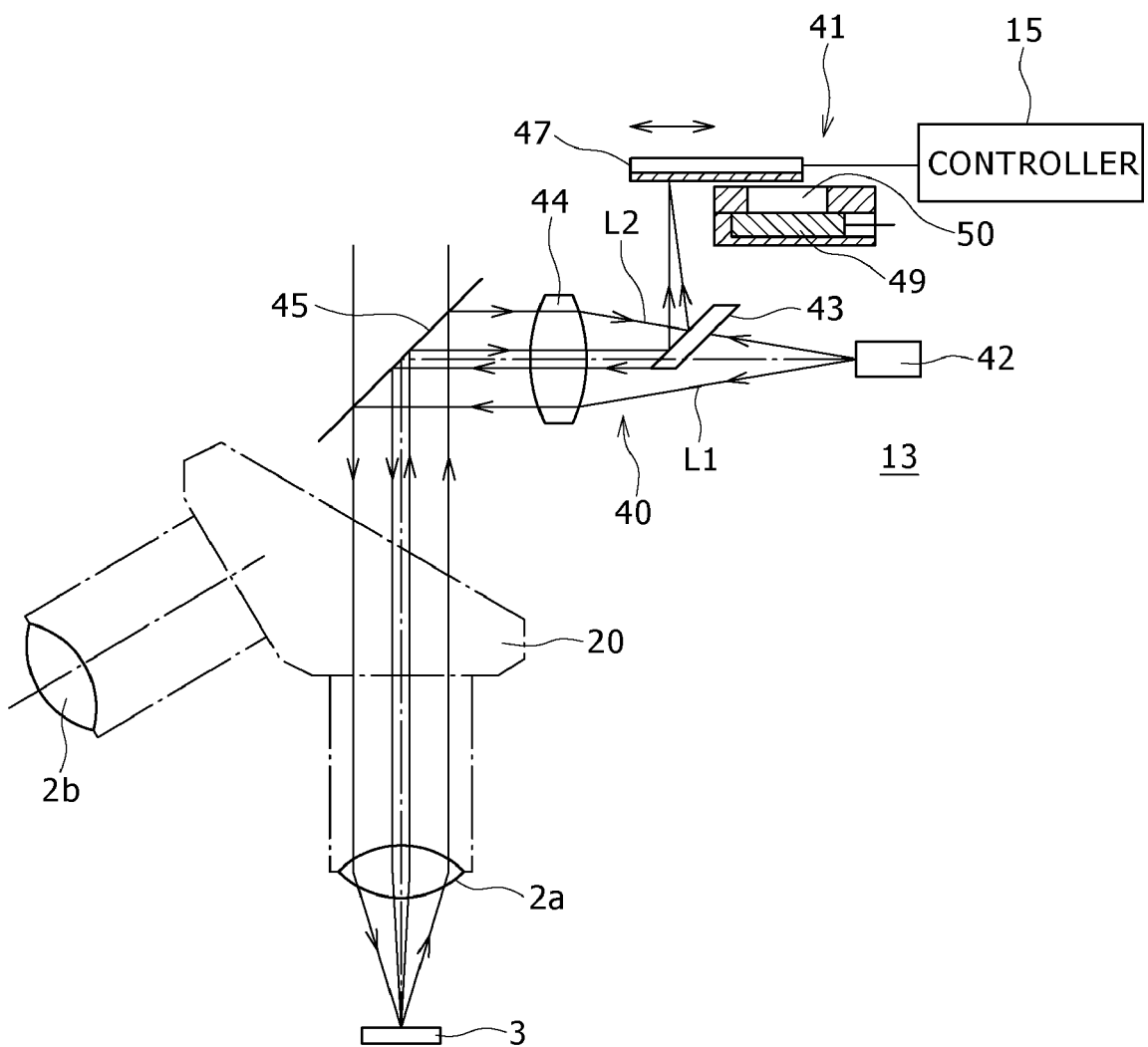
FIG. 3 is a schematic diagram illustrating the basic configuration of the automatic focus control unit.

The automatic focus control unit 13 is next described with reference to FIGS. 2 and 3. FIG. 2 illustrates an embodiment of the automatic focus control unit 13 and FIG. 3 is a schematic diagram illustrating a configuration of the automatic focus control unit 13. Referring to FIGS. 2 and 3, the automatic focus control unit 13 includes an irradiation portion 40 for emitting an emission laser beam L1 for focus control and a photo-detecting portion 41 for detecting a reflected laser beam L2 resulting from the emission laser beam L1 emitted from the irradiation portion 40 to the testing sample 3 and reflected therefrom.

The irradiation portion 40 includes a first light-emitting element 42 for emitting the emission laser beam L1; a knife-edge mirror 43 for shielding at least a portion of the laser beam L1 emitted from the first light-emitting element 42; a collimator lens 44 for converting the divergence angle of the laser beam L1 emitted from the first light-emitting element 42 to bring the emission laser beam L1 into parallel light; and a dichroic mirror 45 adapted to reflect the emission laser beam L1 that passed through the collimator lens 44, toward the object lens unit 10.

The first light-emitting element 42 uses e.g. a semiconductor laser diode. The knife-edge mirror 43 is such that its edge portion is disposed on the optical axis of the laser beam L1 emitted from the first light-emitting element 42 and of the laser beam L2 reflected from the testing sample 3. In the knife-edge mirror 43, a plane opposed to the first light-emitting element 42 is formed as a shielding plane which prevents the transmission of a laser beam and which shields about 55% of the emission laser beam L1. In addition, in the knife-edge mirror 43, a plane on the side opposed with the shielding surface opposed to the first light-emitting element 42 is formed as a mirror surface, which fully reflects the laser beam L2 reflected from the testing sample 3 toward the photo-detecting portion 41.

The dichroic mirror 45 reflects toward the object lens unit 10 the emission laser beam L1 brought into the parallel light by the collimator lens 44. In addition, the dichroic mirror 45 reflects the laser beam L2 reflected from the testing sample 3, toward the knife-edge mirror 43 and transmits it toward the image pick-up unit 11.

The photo-detecting portion 41 for detecting the laser beam L2 reflected by the knife-edge mirror 43 includes a line sensor 47 having a plurality of light-receiving elements arranged therein; a slide mechanism 48 for sliding the line sensor 47 in the arrangement direction of the light-receiving elements; a second light-emitting element 49 for directing LED-light to a portion of the light-receiving elements formed in the line sensor 47; and a slit member 50 for restricting an area of the line sensor 47 irradiated with the LED-light emitted from the second light-emitting element 49.

The line sensor 47 is composed of the plurality of generally rectangular, arranged light-receiving elements and detects an amount of light incident on each of the light-receiving elements. Based on the amount of light received by predetermined light-receiving elements of the line sensor 47, the controller 15 produces a focus error signal and drives the drive unit 14 for focusing control. In addition, the light amount of the predetermined light-receiving elements to which LED-light is directed via the slit member 50 is recorded in association with the object lens 2. Every time the object lens 2 is switched, the line sensor 47 is slid to a predetermined position by the slide mechanism 48 based on the predetermined light-receiving elements and the amount of received light recorded in association with the object lens 2 switched.

As illustrated in e.g. FIG. 2, such a line sensor 47 is formed on the slider 51 so as to be slidable in the direction of arrow S perpendicular to the optical axis of the reflected laser beam L2 and in the direction opposite thereto. The slider 51 is slidably supported by a housing constituting part of the photo-detecting portion 41 and is constantly biased in the direction of arrow S by a spring 52 abutted against the slide-directional one end thereof. In addition, the slider 51 is formed with an abutment portion 53 located in the biasing direction of the spring 52. A lever 55 of the slide mechanism 48 is abutted against the abutment portion 53. The slider 51 is slid in the direction of arrow S and in the direction opposite thereto by swinging the lever 55.

The slide mechanism 48 for sliding the line sensor 47 includes a piezo actuator 54 and the lever 55 illustrated in e.g. FIG. 2. The piezo actuator 54 receives voltage necessary to allow the controller 15 to slide the line sensor 47 in association with the object lens 2. The lever 55 is turnably supported by the housing of the photo-detecting portion 41 and has one end abutted against the piezo actuator 54 and the other end abutted against the abutment portion 53 of the slider 51. The lever 55 receives the biasing force of the spring 52 via the abutment portion 53 to be constantly turnably biased in the direction of arrow R in FIG. 2.

In the slide mechanism 48 described above, if the piezo actuator 54 is expanded, the lever 55 is turned in the counter direction of arrow R against the biasing force of the spring 52 to slide the slider 51 in the counter direction of arrow S. In addition, if the piezo actuator 54 is contracted, the slider 51 undergoes the biasing force of the spring 52 to be slid in the direction of arrow S and to be turned in the direction of arrow R. Thus, the slide mechanism 48 slides the line sensor 47 in the direction perpendicular to the optical axis of the reflected laser beam L2 to a reference position where the reflective laser beam L2 is directed to predetermined light-receiving elements of the line sensor in association with the object lens 2.

Figure 4:
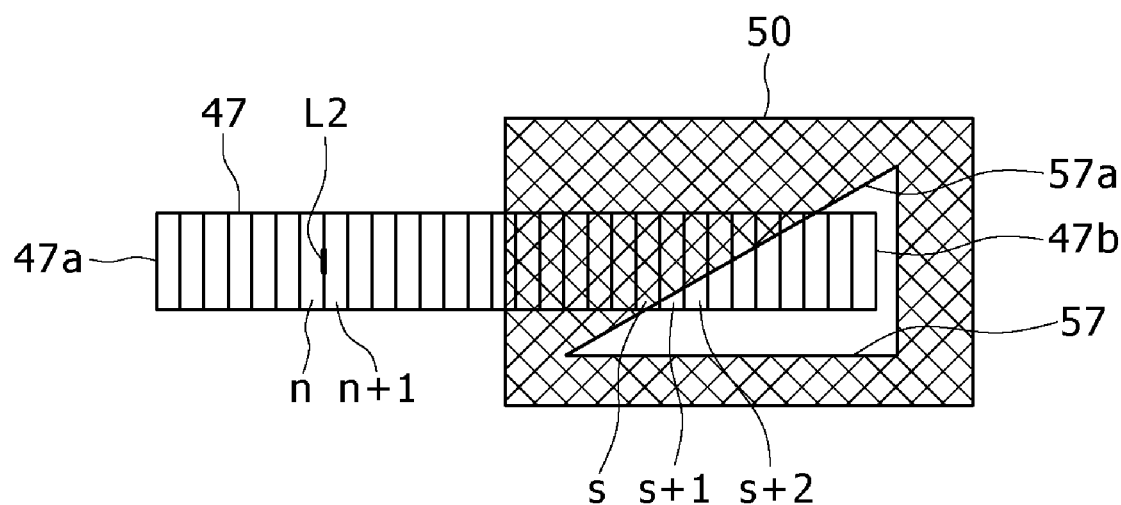
FIG. 4 illustrates a photo-detecting portion.

The photo-detecting portion 41 includes the second light-emitting element 49 for emitting LED-light to the light-receiving elements of the line sensor 47 and the slit member 50 for restricting the area irradiated with the LED-light emitted from the second light-receiving element 49. In addition, the second light-emitting element 49 and slit member 50 are opposed to the line sensor 47. The second light-emitting element 49 uses e.g. a light-emitting diode. As illustrated in FIG. 4, the slit member 50 is formed with an opening portion 57 adapted to direct the LED-light emitted from the second light-emitting element 49 to the plurality of light-receiving elements. These light-receiving elements are provided on the other end 47b on the side opposite to the one end 47a of the line sensor 47 formed with the light-receiving elements to which the laser beam L2 reflected from the testing sample 3 is directed.

The opening portion 57 is formed with an oblique side 57a adapted to sequentially and gradually increase in the arrangement direction the irradiation area of the light-receiving elements arranged close to the other end 47b. The oblique side 57a obliquely cuts across at least three of the light-receiving elements arranged close to the other end 47b. In this way, the light-emitting elements of the line sensor 47 opposed to the second light-emitting element 49 via the opening portion 57 are increased in the area irradiated with the LED-light along the arrangement direction so that the detected amount of light is increased stepwise. The photo-detecting portion 41 can determine a position of the line sensor 47 with respect to the slit member 50 based on the predetermined light-receiving elements to which the LED-light is directed from the second light-emitting element 49 via the slit member 50 and on the amount of light directed to the predetermined light-receiving elements.

The automatic focus control unit 13 allows the emission laser beam L1 to be focused on the testing sample 3 for each of the object lenses 2 provided in the object lens unit 10. This sets the reference position where the laser beam L2 reflected from the testing sample 3 is directed equally in quantity to the predetermined light-receiving elements arranged close to the one end 47a of the line sensor 47. At this reference position, the automatic focus control unit 13 registers as reference elements the predetermined light-receiving elements which is arranged close to the other end 47b of the line sensor 47 and to which the LED-light is directed from the second light-emitting element 49. In addition, the automatic focus control unit 13 registers as reference voltage the amount of light directed to the predetermined light-receiving elements from the second light-emitting element 49.

If the object lens 2 is switched, the automatic focus control unit 13 determines a reference position of the line sensor 47 associated with the object lens 2 thus switched on the basis of the reference elements and reference signal registered. The line sensor 47 is automatically shifted to the reference position by being slid by the slide mechanism 48 until the reference element provides the voltage level of the reference signal.

Figure 5:
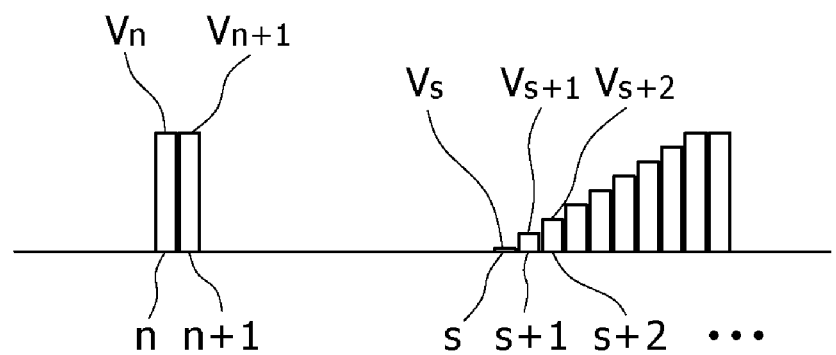
FIG. 5 is a graph illustrating amounts of received light detected by a line sensor.

More specifically, the automatic focus control unit 13 allows the emission laser beam L1 to be focused on the testing sample 3 via one object lens 2 and determines as a reference position a position where two light-receiving elements n, n+1 arranged close to the one end 47a of the line sensor 47 equally receive the laser beam L2 reflected from the testing sample 3. Such a reference position is determined for each of the object lenses 2a, 2b, etc. provided in the object lens unit 10 (FIG. 4). As illustrated in FIG. 5, at each reference position, the object lenses 2a, 2b, etc. are each focused on the testing sample 3, the two light-receiving elements n, n+1 equally receive the reflected laser beam L2 directed thereto so that the voltage levels Vn, Vn+1 are equal to each other.

The automatic focus control unit 13 provides a plurality of light-emitting elements s, s+1, s+2, etc. arranged on the other end 47b of the line sensor 47 at each of the associated reference positions so as to receive the LED-light of the second light-emitting element 49 directed thereto via the opening portion 57 of the slit member 50 and the voltage levels Vs, Vs+1, Vs+2, etc. corresponding respectively to the amounts of light received by the light-receiving elements s, s+1, s+2, etc. In this case, the light-emitting elements s, s+1, s+2, etc, are increased stepwise to provide light-receiving amounts Vs, Vs+1, Vs+2, etc., respectively.

Upon selecting the object lens 2a of the object lens unit 10, the automatic focus control unit 13 registers, as reference elements associated with the object lens 2a, the element numbers of the two light-receiving elements n, n+1 equally receiving the reflected laser beam L2 directed thereto, and the element numbers of the light-receiving elements s, s+1, s+2, etc. obtaining the stepwise signals. In addition, the automatic focus control unit 13 resisters, as the reference signal associated with the object lens 2a, the stepwise voltage levels Vs, Vs+1, Vs+2, etc. detected in the light-receiving elements s, s+1, s+2, etc., respectively.

The registration of such reference elements and reference signals is performed as below. An operator performs focusing on the testing sample for each object lens 2, determines the reference elements and reference signals while the focusing is achieved, and registers them in the memory provided in a controller not illustrated. From the next time onward, if the same object lens 2a is selected and focusing is performed on the testing sample 3, the automatic focus control unit 13 allows the slide mechanism 48 to slide the line sensor 47 until the reference elements s, s+1, s+2, etc, previously registered in association with the object lens 2a determines the reference signals Vs, Vs+1, Vs+2, etc., respectively. Thus, the automatic focus control unit 13 constantly holds the line sensor 47 at the reference position associated with the object lens 2a.

The automatic focus control unit 13 similarly registers reference elements and reference signals for the object lens 2b and the other object lenses. The reference elements and the voltage levels of the reference signals may be different from each other or the same for every object lens 2.

Figure 6A:
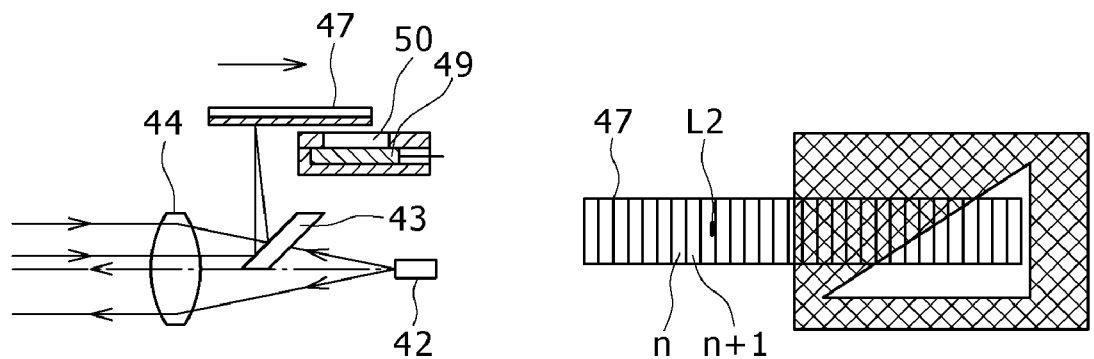
FIGS. 6A, 6B and 6C illustrate the automatic focus control unit in the state where an object lens is switched to cause the misalignment of optical axis, FIG. 6A illustrating the optical axis deviating rightward on the line sensor, FIG. 6B illustrating the optical axis not deviating on the line sensor, and FIG. 6C illustrating the optical axis deviating leftward on the line sensor.
Figure 6B:
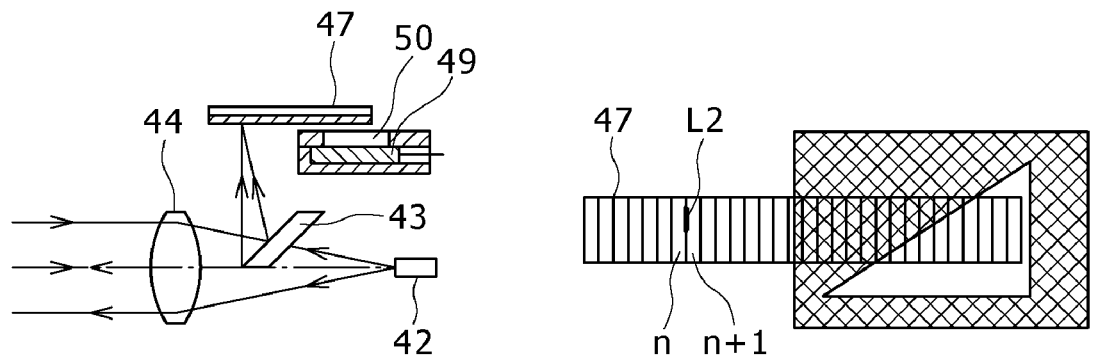
Figure 6C:
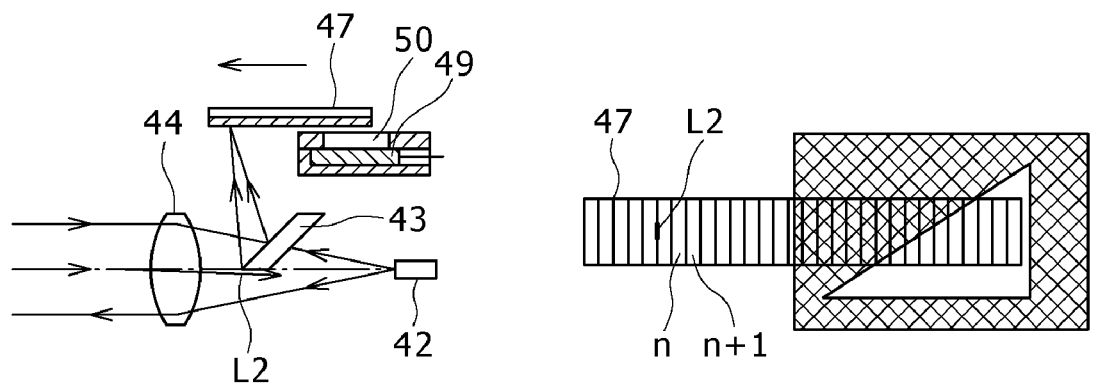

If the object lens 2a is switched to the object lens 2b to cause misalignment of optical axis as shown in FIGS. 6A and 6C, the reflected laser beam L2 is directed to a position deviating from the light-receiving elements n, n+1 which are the reference elements associated with the object lens 2b switched. In this case, the line sensor 47 is slid in the arrangement direction of the light-receiving elements by the slide mechanism 48 so that the two reference elements n, n+1 may equally receive the reflected laser beam L2. In this way, the automatic position adjustment of the line sensor is performed.

At the reference position where the object lens 2b shown in FIG. 6B is focused on the testing sample 3, the element numbers of the light-receiving elements n, n+1 to which the laser beam L2 reflected from the testing sample 3 is equally directed and of the plurality of light-receiving elements s, s+1, s+2, etc. to which the LED-light is directed from the second light-emitting element 49 are registered as the reference elements associated with the object lens 2b. In addition, the signals Vs, Vs+1, Vs+2, etc. detected respectively by the light-receiving elements s, s+1, s+2, etc. are registered as the reference signals associated with the object lens 2b.

If the object lens 2b is selected and focused on the testing sample 3 from the next time onward, the automatic focus control unit 13 allows the slide mechanism 48 to slide the line sensor 47 until the reference elements s, s+1, s+2, etc. previously registered in association with the object lens 2b measure the reference signals Vs, Vs+1, Vs+2, etc., respectively. In this way, the line sensor 47 is constantly maintained at the reference position associated with the object lens 2b.

Consequently, even if the object lens 2 is switched to cause the misalignment of optical axis or color aberration, the automatic focus control unit 13 can automatically slide the line sensor 47 to the reference position where such misalignment of optical axis or color aberration has previously been corrected. This can perform focusing with speed and accuracy.

The microscope 1 allows the drive unit 14 to shift the stage on which the testing sample 3 is placed or the object lens unit 10 in the focusing direction, i.e., in the optical-axial direction of the object lens 2 for automatic focusing while the automatic focus control unit 13 maintains the line sensor 47 at the reference position associated with the selected object lens 2 so that the laser beam L2 reflected from the testing sample 3 may be directed to the reference elements n, n+1 equally in quantity.

Figure 7A:
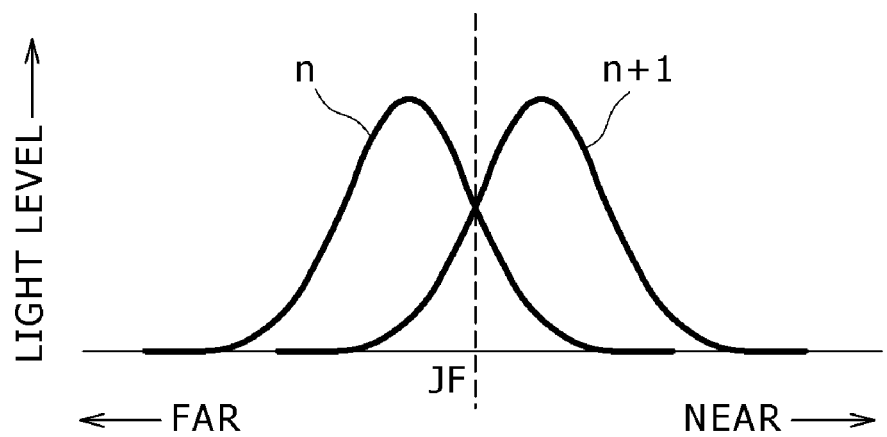
FIGS. 7A and 7B are graphs illustrating the amount of a received reflected laser beam detected by reference elements.
Figure 7B:
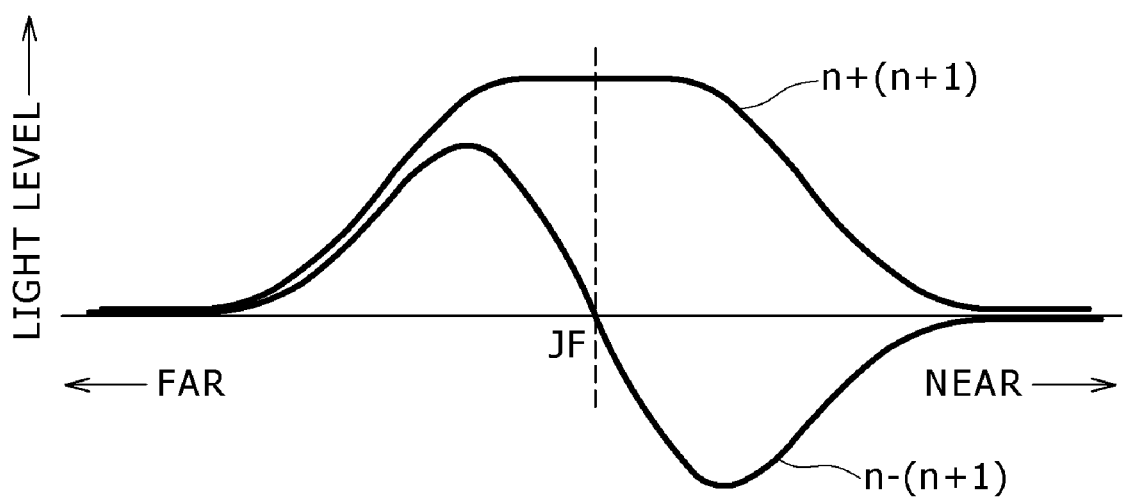

The automatic focusing described above is performed by the controller 15 which monitors the amounts of the reflected laser beams L2 received by the reference elements n, n+1, produces focus servo signals and feeds them back to the drive unit 14. In particular, the line sensor 47 detects the amount of light or the level of light directed to each of the reference elements n, n+1 as shown in FIG. 7A. With the line sensor 47, the controller 15 gets a difference by subtracting the signal of the reference element n+1 from the signal of the reference element n as shown in FIG. 7B. Based on the so-called focus error signal obtained as an S-curve as shown in the figure, the controller 15 drives the object lens 2.

As illustrated in FIG. 5, the automatic focus control unit 13 allows the drive unit 14 to drive the object lens unit 10 in the optical-axial direction of the object lens 2 so that the distance between the object lens 2 and the testing sample 3 may be equal to the focal length and the amounts of light directed to the light-receiving elements n, n+1 may become equal to each other. In other words, the controller 15 controls the drive unit 14 so that the object lens unit 10 is stopped at a point (a zero-cross point), indicated with symbol JF in FIG. 7B, where the subtracted value between the amounts of light received by the light-receiving elements n, n+1 indicates a value equal to zero.

If the subtracted value between the amounts of light received by the light-receiving elements n, n+1 is positive, it is determined that the focal point is above the just focus point JF. In such a case, the object lens unit 10 is shifted downward aiming the just focus point JF. On the other hand, if the subtracted value between the amounts of light received by the light-receiving elements n, n+1 is negative, it is determined that the focal point is below the just focus point JF. In such a case, the object lens unit 10 is shifted upward aiming the just focus point JF.

In this case, since the line sensor 47 has been shifted by the automatic focus control unit 13 to the reference position associated with the previously selected object lens 2, the microscope 1 can perform fast focusing on the testing sample 3 without largely deviating from the focal point of the object lens 2.

As described above, while the illumination unit 12 shines the illumination light on the testing sample 3, the microscope 1 having been subjected to the focusing by the automatic focus control unit 13 uses such light and allows the imaging unit 5 to pick up an image of the testing sample 3.

A description will next be given of a check step of the testing sample 3 using the automatic focus control unit 13 described above. First, when focusing is performed on the testing sample 3 for each of the object lenses 2a, 2b, etc. provided in the object lens unit 10, the reference position is set where the reflective laser beam L2 is equally directed to the plurality of light-receiving elements provided close to the one end 47a of the line sensor 47. The automatic focus control unit 13 registers the plurality of light-receiving elements n, n+1 and the plurality of light-receiving elements s, s+1, s+2, etc. in an embedded memory as the reference elements associated with the selected objective lens. Here, the plurality of light-receiving elements n, n+1 are provided close to the one end 47a of the line sensor 47 with respect to the reference position to receive the same amount of the reflective laser beam L2. The plurality of light-receiving elements s, s+1, s+2, etc. are provided close to the other end 47b of the line sensor 47 and are such that the irradiation area of the LED-light emitted from the second light-emitting element 49 is gradually increased through the slit member 50. In addition, the automatic focus control unit 13 detects the amounts of light received by the reference elements s, s+1, s+2, etc. and registers the voltage levels associated therewith as the reference signals in the embedded memory.

In this step of registering the reference elements and reference signals, when the object lens unit 10 is driven by an operator to be focused on the testing sample 3 for achieving the focusing, the position where the reflected laser beam L2 is directed to the light-receiving elements n, n+1 equally in quantity is set as the reference position of the line sensor 47. In addition, the light-receiving elements n, n+1 associated with the reference position and the light-receiving elements s, s+1, s+2, etc. adapted to receive the LED-light of the second light-emitting element 49 are registered as the reference elements. Further, the amounts of light received by the reference elements s, s+1, s+2, etc. are registered as the reference signals in the embedded memory.

The automatic focus control unit 13 sets the reference elements and reference signals in accordance with the reference position of the line sensor 47 for each of the objective lenses 2a, 2b, etc. provided in the objective lens unit 10, and thereafter the testing sample 3 is checked. The microscope 1 is used by switching between the object lenses 2. Specifically, if the testing sample 3 has a large size, a low-power object lens 2 is selected in detecting an alignment mark, whereas a high-power object lens 2 is selected in observing a particular position of the testing sample 3.

The automatic focus control unit 13 slides the line sensor 47 to the reference position based on the reference elements and reference signals previously set in association with the object lens 2 switched. Thus, the automatic focus control unit 13 can perform automatic focusing fast and reliably even if the misalignment of the optical axis or color aberration occurs due to the switching of the object lens 2.

The line sensor 47 is slid to the reference position by the slide mechanism 48 which slides the slider 51 in the direction of arrow S or in the direction opposite thereto so that the reference elements s, s+1, s+2, etc. may have the corresponding voltage levels of the reference signals. In this way, the line sensor 47 is slid in the arrangement direction of the light-receiving elements perpendicular to the optical-axial direction of the reflected laser beam L2 so that the reflected laser beam L2 is directed to both the reference elements n, n+1.

Next, the drive unit 14 drives the object lens unit 10 so that the same amount of the reflected laser beam L2 is directed to the reference elements n, n+1. In the microscope 1, the amounts of the light received by the reference elements n, n+1 are detected by the automatic focus control unit 13, and based on the detected values the controller 15 produces a focus error signal. Based on the focus error signal the microscope 1 allows the drive unit 14 to shift the object lens unit 10 in the focusing direction, i.e., in the optical-axial direction. The object lens unit 10 is shifted until the amounts of light received by the reference elements n, n+1 become equal to each other, whereby the microscope 1 completes the focusing on the testing sample 3.

Thereafter, if the object lens 2 has been switched, similarly to the above, the microscope 1 allows the line sensor 47 to be slid to the reference position and the object lens unit 10 to be moved upward or downward until the light received by the reference elements n, n+1 becomes equal to each other.

Incidentally, also during tracing operation in which the object lens unit 10 is moved relative to the testing sample 3 to change check points or move along them, the automatic focus control unit 13 maintains the focusing, whereby measurement or check after or during the movement can be performed fast. During the tracing operation, the automatic focus control unit 13 monitors the voltages of the reference signals of the reference elements s, s+1, s+2, etc. previously registered in association with the selected object lens 2, slides the line sensor 47 to cancel the difference relative to such a reference signal, thereby maintaining the reference position. While maintaining the reference position, the automatic focus control unit 13 allows the drive unit 14 to shift the object lens unit 10 in the optical-axial direction of the object lens 2 so that the reference elements n, n+1 may equally receive the laser beam L2 reflected from the testing sample 3 being traced. Thus, the automatic focus control unit 13 can automatically perform the focusing even during the tracing operation.

Incidentally, the opening portion 57 and oblique side 57a of the slit member 50 are formed so that the LED-light of the second light-emitting element 49 may be directed to five or more of the light-receiving elements arranged close to the other end 47b of the line sensor 47. Three light-receiving elements resulting from excluding the light-receiving elements on both sides, e.g., the three middle light-receiving elements, are selected as the light-receiving elements s, s+1, s+2 adapted to detect the reference signals. In addition, the signals Vs, Vs+1, Vs+2 detected respectively by the three light-receiving elements thus selected are registered as reference signals. In this way, even if light directed to edge portions of the opening portion 57 of the slit member 50 varies in quantity, the reference signal can stably be detected so that the line sensor 47 can reliably be shifted to the reference position.

The slit member 50 is such that the opening portion 57 is opened more largely than the light-receiving elements close to the other end 47b of the line sensor 47. Specifically, as shown in FIG. 4, the light-receiving elements close to the other end 47b of the line sensor 47 are opposed to the second light-emitting element 49 over the whole surface thereof so as to receive the LED-light through over the whole surface thereof. A plurality of the light-receiving elements subjected to the whole surface irradiation are provided adjacently to the light-receiving elements which are gradually increased in quantity of light directed thereto. Thus, it can be confirmed that the LED-light directed to the second light-emitting element 49 provides predetermined power by measuring the quantity of light directed to the light-emitting elements subjected to the whole surface irradiation.

The slit member 50 described above is such that the oblique side 57a of the opening portion 57 is set to have an angle of 35° in the case of using the line sensor 47 as below. The light-receiving elements of the line sensor 47 are each formed to have a longitudinal length of 200 μm and a width of 54.5 μm and have a pitch of 9 μm. In addition, the light-receiving elements have element numbers 1 through 128 from the one end 47a to the other end 47b.

Figure 8:
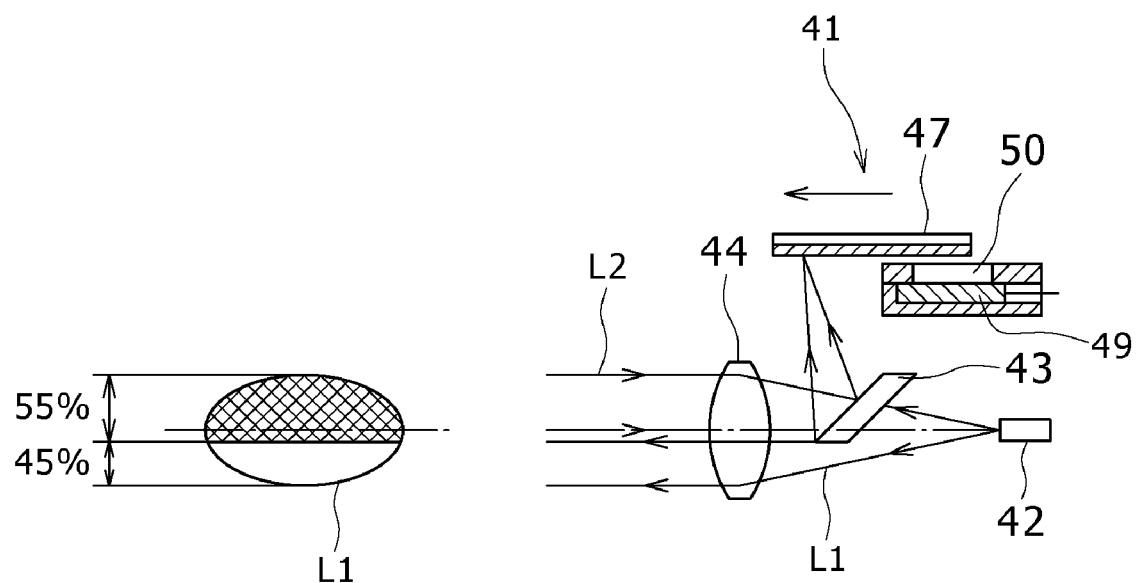
FIG. 8 illustrates the automatic focus control unit in which a little more than half of an emission laser beam is shielded by a knife-edge mirror.

Referring to FIG. 8, the knife edge mirror 43 disposed in the automatic focus control unit 13 is adapted to shield a little more than half (about 55%) of the laser beam L1 emitted from the first light-emission element 42 and direct about 45% of the emitted laser beam L1 toward the collimator lens 44. This is due to the following. If half of the light flux is shielded by the knife edge mirror 43 which is an optical path splitting member, the object lens 2 may be switched to cause the misalignment of optical axis. In such a case, the laser beam L2 reflected from the testing sample 3 may enter the first light-emitting element 42 using a semiconductor laser diode in some cases. If the reflected laser beam L2 enters the first light-emitting element 42, the emission laser beam L1 is made to resonate, which makes laser power unstable, with the result that automatic focusing may probably be adversely affected.

Consequently, the automatic focus control unit 13 allows the knife-edge mirror 43, an optical path splitting member, to shield a little more than half (about 55%) of light flux and direct, not shielded, about 45% of the emission laser beam L1 into the collimator lens 44. In this way, the automatic focus control unit 13 can prevent the laser beam L2 reflected from the testing sample 3 from entering the first light-emitting element 42 even if the misalignment of optical axis occurs. Thus, the automatic focusing can be performed precisely and reliably.

Figure 9:
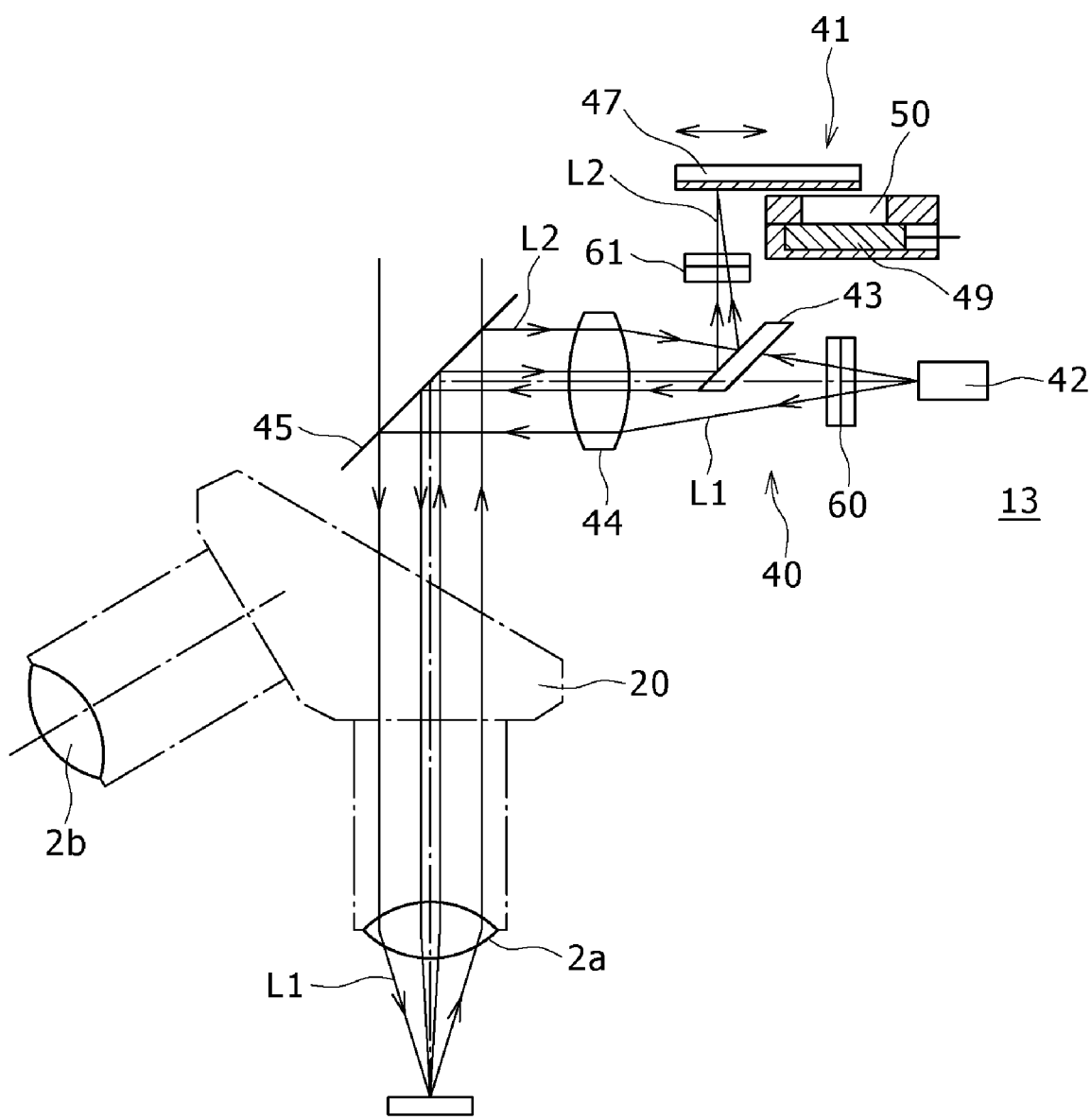
FIG. 9 is a schematic diagram illustrating a configuration of an automatic focus control unit arranged with a pair of cylindrical lenses.

Referring to FIG. 9, the automatic focus control unit 13 may include a pair of cylindrical lenses 60, 61 as optical devices having refractive forces different from each other in the perpendicular direction and located on the optical path of the laser beam L1 emitted from the first light-emitting element 42. By using the cylindrical lens 60, 61, the automatic focus control unit 13 can shape the laser beam L1 directed to the testing sample 3 into a general ellipse to minimize the influence of uneven edges of the testing sample 3.

More specifically, if the emission laser beam L1 is directed to the testing sample 3, e.g. to a semiconductor wafer formed with uneven edges on the front surface, the emission laser beam L1 is scattered by the uneven edges resulting from pattern formation to make the amount of the reflected laser beam L2 insufficient. Thus, the amount of the reflected LED-light L2 received by the line sensor 47 is insufficient, which may probably adversely affect the accuracy of focusing. Consequently, the automatic focus control unit 13 produces the elliptical laser beam by use of the cylindrical lenses 60, 61 and directs it to the testing sample 3. Thus, the influence of the scattering by the uneven edges can be minimized.

As shown in FIG. 9, in the automatic focus control unit 13, the cylindrical lens 60 is disposed between the first light-emitting element 42 and the knife-edge mirror 43 and the cylindrical lens 61 is disposed between the mirror surface of the knife-edge mirror 43 and the line sensor 47.

The cylindrical lens 60 allows the laser beam L1 emitted from the first light-emitting element 42 to cause astigmatism, thereby shaping it into an elliptical shape from a circular spot. The emission laser beam L1 deformed like an elongate hole is shielded by the knife-edge mirror 43 by a little more than half (about 55%) and the remaining one is directed to the collimator lens 44. Thereafter, as described earlier, the emission laser beam L1 is reflected by the dichroic mirror 45 toward the object lens unit 10 and directed to the testing sample 3. In this case, the emission laser beam L1 directed to the testing sample 3 is shaped into an ellipse by the cylindrical lens 60.

The laser beam L2 reflected from the testing sample 3 is passed through the dichroic mirror 45 and directed to the imaging unit 11 constituting part of the observation optical system and also it is reflected from the mirror surface of the dichroic mirror 45 and of the knife-edge mirror 43 and directed to the cylindrical lens 61. The reflected laser beam L2 is again directed to the cylindrical lens to be deformed into the circular spot from the ellipse and is received by the line sensor 47. As described above, the automatic focus control unit 13 detects the amounts of reflected laser beam L2 directed to the reference elements n, n+1 of the line sensor 47. The controller 15 controls the drive unit 14 so that the amounts of the reflected laser beam L2 directed to the reference elements n, n+1 may be made equal to each other. That is to say, the drive unit 14 shifts the object lens unit 10 or the stage on which the testing sample 3 is placed, in the optical-axial direction for automatic focusing.

Figure 10:
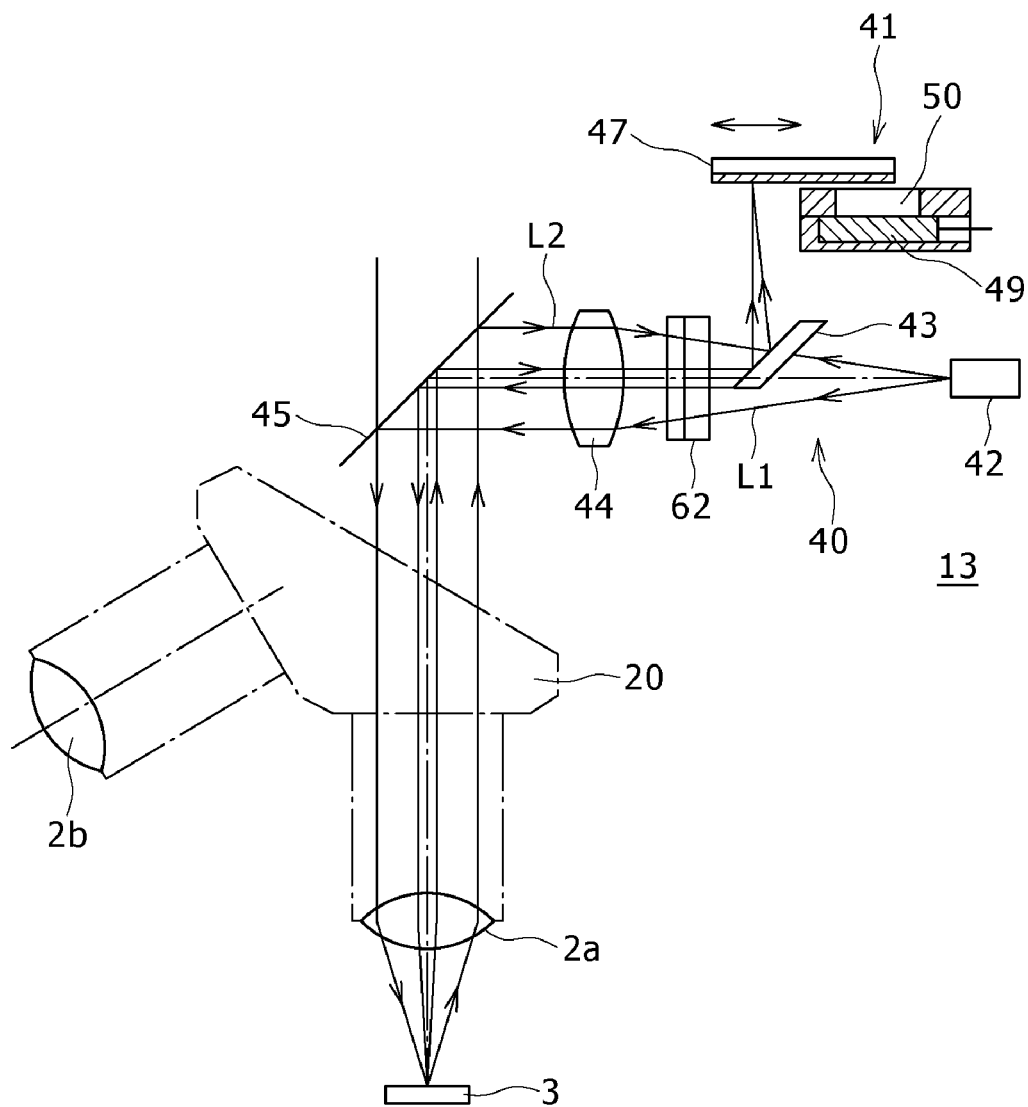
FIG. 10 is a schematic diagram illustrating a configuration of an automatic focus control unit arranged with a single cylindrical lens.
Figure 11:
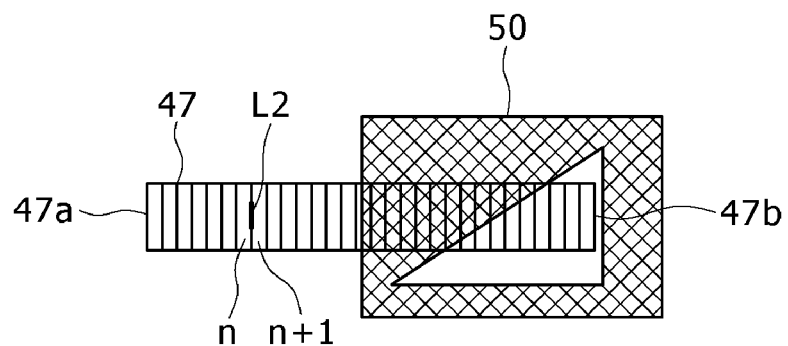
FIG. 11 illustrates a photo-detecting portion in the automatic focus control unit arranged with the single cylindrical lens.
Figure 12:
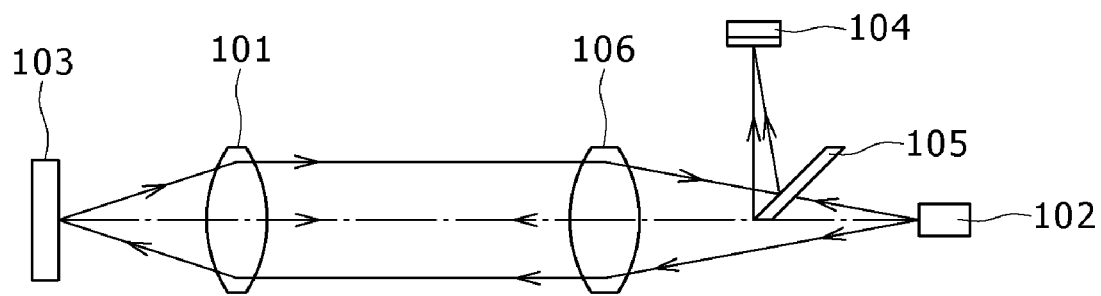
FIG. 12 is a schematic diagram illustrating a traditional focus control unit.
Figure 13:
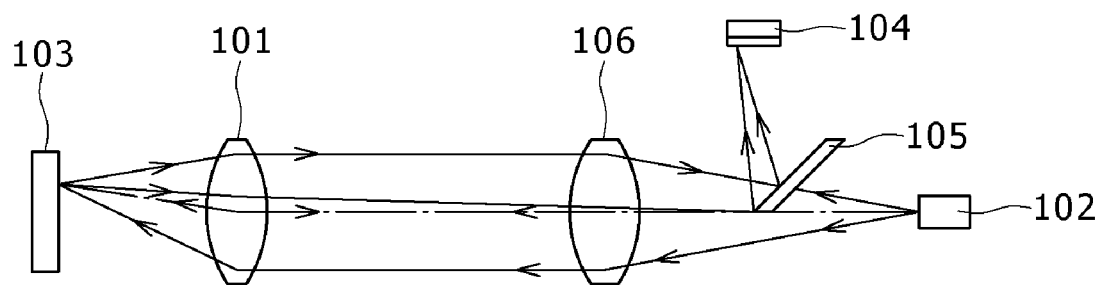
FIG. 13 is a schematic diagram illustrating the traditional focus control unit with a switched object lens.

Incidentally, the automatic focus control unit 13 may be such that the cylindrical lens 62 is disposed singularly or it is disposed between the knife-edge mirror 43 and the collimator lens 44 as shown in FIG. 10. In this case, the reflected laser beam L2 directed to the reference elements n, n+1 of the line sensor 47 is focused into an eclipse with a longitudinal direction perpendicular to the arrangement direction of the light-receiving elements as shown in FIG. 11. Also in this case, the amount of the reflected laser beam L2 is enough unless it is directed to the outside of the light-receiving elements of the line sensor 47. The controller 15 controls the drive unit 14 so that the amounts of the reflected laser beam L2 directed to the reference elements n, n+1 may be equal to each other. That is to say, the drive unit 14 shifts the object lens unit 10 or the stage on which the testing sample is placed, in the optical-axial direction for automatic focusing.

Incidentally, the application of the automatic focus control unit and method according to the embodiments of the present invention is not limited to the optical microscope. For example, they can be applied to optical electronic equipment such as depth meters and automatic focus control units of laser processing machines.

In addition, the automatic focus control unit according to the embodiments of the present invention can be used by being built in electronic devices such as normal microscopes used heretofore.

The slide mechanism 48 for sliding the line sensor 47 is not limited to the configuration using the piezo actuator but can be applied to any mechanism for sliding the line sensor 47 along the arrangement direction of the light-receiving elements.

The present application contains subject matter related to that disclosed in Japanese Priority Patent Application JP 2008-103984 filed in the Japanese Patent Office on Apr. 11, 2008, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. An automatic focus control unit comprising:
a first light-emitting element adapted to emit a laser beam to a sample via a single object lens selected from a plurality of object lenses different in magnification from each other;
a line sensor having a plurality of light-receiving elements arranged adjacently to each other, a portion of the plurality of light-receiving elements receiving light reflected from the sample;
a second light-emitting element adapted to emit a laser beam to another portion of the plurality of light-receiving elements;
a slit member adapted to cut across the line sensor so as to gradually increase an area of the line sensor irradiated with the laser beam emitted from the second light-emitting element;
a shifting mechanism operative to relatively shift the line sensor in an arrangement direction of the plurality of light-receiving elements with respect to an optical axis of the reflected light; and
a controller adapted to register the plurality of light-receiving elements irradiated with the laser beam emitted from the second light-emitting element and amounts of light received by the plurality of light-receiving elements in association with the selected object lens in a state where the selected object lens is focused on the sample, and control a position of the line sensor based on the registered values when the object lens is used again.

2. The automatic focus control unit according to claim 1, wherein in the state where the object lens is focused on the sample, the reflected light is equally directed to two adjacent light-receiving elements of the line sensor.

3. The automatic focus control unit according to claim 1, wherein for each of a plurality of object lens different in magnification from each other the controller registers the plurality of light-receiving elements irradiated with the laser beam emitted from the second light-emitting element via the slit member in the state where the sample is subjected to focusing, and an amount of light received by the plurality of the light-receiving elements, and controls a position of the line sensor relative to the slit member based on the registered value associated with each of the object lenses when the object lens is switched.

4. The automatic focus control unit according to claim 1, wherein a knife-edge mirror is disposed between the first light-emitting element and the object lens.

5. The automatic focus control unit according to claim 4, wherein in the state where the single object lens selected is focused on the sample, the controller registers two adjacent light-receiving elements that receives the same amount of light reflected from the sample, and shifts the object lens or the sample in an optical-axial direction of the object lens so that the reflected light may equally be directed to the plurality of light-receiving elements detected, when the object lens is used again.

6. The automatic focus control unit according to claim 4, wherein the knife-edge mirror shields about 55% of the laser beam emitted from the first light-emitting element.

7. The automatic focus control unit according to claim 1, wherein the slit member has an inclination of about 35° relative to an arrangement direction of the light-receiving elements of the line sensor.

8. The automatic focus control unit according to claim 1, wherein a cylindrical lens is disposed on an optical path between the first light-emitting element and the sample.

9. An electronic device equipped with an automatic focus control device comprising:
- a first light-emitting element adapted to emit a laser beam to a sample via a single object lens selected from a plurality of object lenses different in magnification from each other;
- a line sensor having a plurality of light-receiving elements arranged adjacently to each other, a portion of the plurality of light-receiving elements receiving light reflected from the sample;
- a second light-emitting element adapted to emit a laser beam to another portion of the plurality of light-receiving elements;
- a slit member adapted to cut across the line sensor so as to gradually increase an area of the line sensor irradiated with the laser beam emitted from the second light-emitting element;
- a shifting mechanism operative to relatively shift the line sensor in an arrangement direction of the plurality of light-receiving elements with respect to an optical axis of the reflected light; and
- a controller adapted to register the plurality of light-receiving elements irradiated with the laser beam emitted from the second light-emitting element and amounts of light received by the plurality of light-receiving elements in association with the selected object lens in a state where the selected object lens is focused on the sample, and control a position of the line sensor based on the registered values when the object lens is used again.

10. An automatic focus control method comprising the steps of:
- registering, for each of a plurality of object lenses provided in a selectable manner and having different magnifications, as reference elements a plurality of light-receiving elements located close to one end of a line sensor to be subjected to irradiation with light reflected from a sample and another plurality of light-receiving elements located close to the other end of the line sensor so as to have a gradually increased area that receives a laser beam emitted from a second light-emitting element via a slit member, at a reference position of the line sensor where a laser beam emitted from a first light-emitting element is focused on the sample, and registering amounts of light received by the reference elements located close to the other end of the line sensor as reference signals;
- shifting the line sensor to the reference position based on the reference elements and on the reference signals in association with the selected object lens; and
- shifting the object lens or the sample in an optical-axial direction of the object lens so that reflected light resulting from the laser beam directed to the sample via the selected object lens may equally be directed to the reference elements located close to the one end of the line sensor shifted to the reference position.

* * * * *

UNITED STATES PATENT AND TRADEMARK OFFICE
CERTIFICATE OF CORRECTION

PATENT NO.       : 8,071,929 B2
APPLICATION NO.  : 12/406462
DATED            : December 6, 2011
INVENTOR(S)      : Hideki Sato et al.

Page 1 of 1

It is certified that error appears in the above-identified patent and that said Letters Patent is hereby corrected as shown below:

On the title page: item

(75) "Kohki Matsuki, Osaki (JP)"

should be

(75) --Kohki, Matsuki, Miyagi (JP)--

Signed and Sealed this
Eighteenth Day of December, 2012

David J. Kappos
*Director of the United States Patent and Trademark Office*